(12) United States Patent
Meyer

(10) Patent No.: US 6,210,263 B1
(45) Date of Patent: Apr. 3, 2001

(54) FIELD DRESSING APPARATUS

(76) Inventor: James J. Meyer, 6230 Ridge Rd., Chanhassen, MN (US) 55317

( * ) Notice: Subject to any disclaimer, the term of this patent is extended or adjusted under 35 U.S.C. 154(b) by 0 days.

(21) Appl. No.: 09/518,280

(22) Filed: Mar. 3, 2000

(51) Int. Cl.[7] .................................................. A22B 5/00
(52) U.S. Cl. .......................................... 452/120; 452/121
(58) Field of Search .................................. 452/120, 122

(56) References Cited

U.S. PATENT DOCUMENTS

| | | | |
|---|---|---|---|
| 4,529,240 | 7/1985 | Engel | 294/141 |
| 4,607,432 | 8/1986 | Montgomery | 30/294 |
| 4,682,417 | 7/1987 | Henslin et al. | 30/294 |
| 4,690,047 | * 9/1987 | Balzano | 99/542 |
| 4,707,920 | 11/1987 | Montgomery | 30/294 |
| 5,056,223 | * 10/1991 | Buck et al. | 30/113.1 |
| 5,199,922 | * 4/1993 | Korenberg et al. | 452/122 |
| 5,320,576 | 6/1994 | Sagen | 452/164 |
| 5,360,368 | 11/1994 | Hajek | 452/197 |
| 5,393,194 | 2/1995 | Smith | 414/546 |
| 5,462,479 | 10/1995 | Hajek | 452/160 |
| 5,580,304 | * 12/1996 | Bleth et al. | 452/122 |
| 5,581,895 | 12/1996 | Jeffcoat | 30/294 |
| 5,590,591 | * 1/1997 | Kim | 99/544 |
| 5,707,281 | 1/1998 | Hicks | 452/197 |
| 5,845,404 | 12/1998 | Jeffcoat | 30/125 |

* cited by examiner

*Primary Examiner*—Willis Little
(74) *Attorney, Agent, or Firm*—Kinney & Lange, P.A.

(57) ABSTRACT

An apparatus for coring out or dissecting an anal sphincter and mobilizing a rectum of an animal includes a probe attached to a first side of a support member and at least one knife blade attached to the support member a fixed distance from the probe. The distance from the surface of the probe to the knife blade is greater than a thickness of a rectal wall.

19 Claims, 4 Drawing Sheets

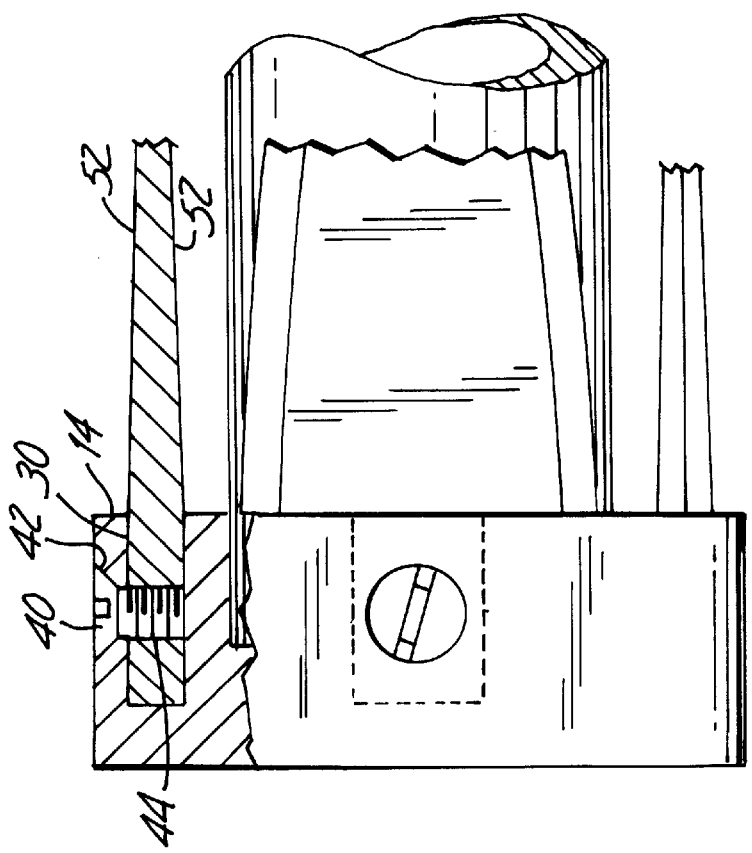
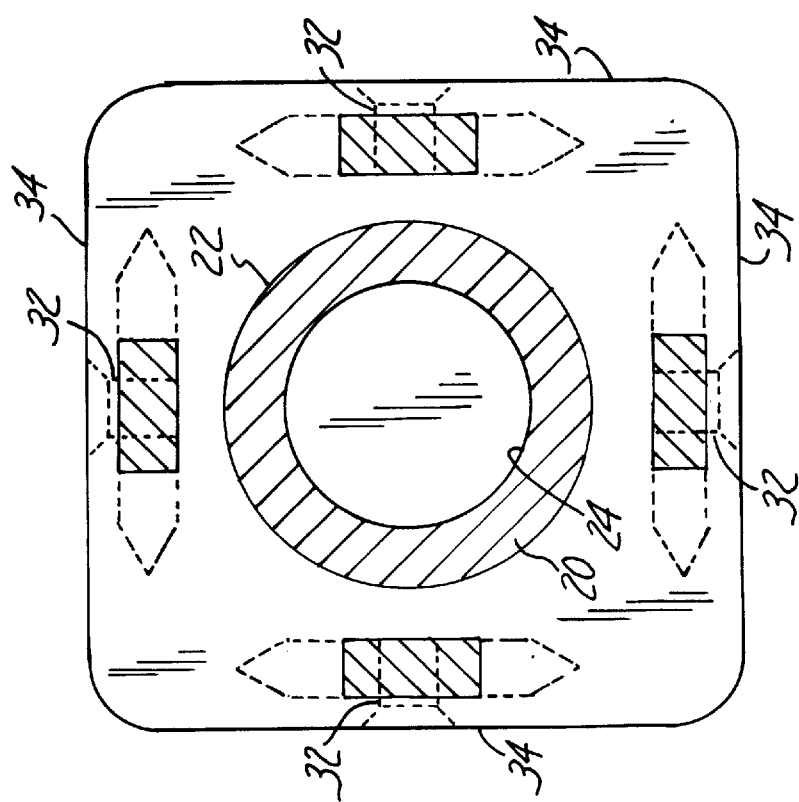
FIG. 4
FIG. 3

FIELD DRESSING APPARATUS

BACKGROUND OF THE INVENTION

The present invention generally relates to an apparatus for field dressing wild or domestic animals. More particularly, the present invention relates to an apparatus for coring out or dissecting the anal sphincter and mobilizing a rectum of an animal being field dressed.

Many people hunt large animals such as deer, elk and moose to harvest the meat. Soon after the animal is killed, the hunter must field dress the animal to keep the meat from becoming tainted. An animal is field dressed by cutting open the animal's abdominal cavity typically by making an incision on the underside of the animal from the rectal region to the ribs of the animal. Once the incision has been made, the major organs and intestines of the animal are removed.

In order to remove the large intestine, the rectum must be detached or mobilized from the rest of the animal's body. While field dressing the animal, the hunter does not want to puncture the wall of the intestine allowing the fecal matter to exit the intestine which will contaminate or taint the animal's flesh. Consequently, the hunter must use great care in detaching or mobilizing the rectum from the rest of the animal's body.

Typically, an animal is field dressed near the place where the animal is slain. Most animals such as deer, elk and moose are slain in their natural habitat which typically is an isolated, remote region. Since the animal is slain in an isolated and remote region there typically is no access to running water. When the fecal matter contacts the flesh of the animal, there is no way to rinse off the fecal matter from the animal's flesh. When fecal matter contacts the animal's flesh for an extended period of time, the animal's flesh will be tainted, making the meat inedible.

The rectal region of the animal is a difficult area to field dress. Typically, a hunter uses the same knife having a broad blade to both make the incision from the rectal area to the ribs and to dissect or mobilize the rectum from the body of the animal by cutting through the anal sphincter of the animal in a circumferential fashion. The anal sphincter is a strong muscle which is difficult to cut through, therefore considerable force is needed to dissect or sever the anal sphincter muscle. Additionally, the pelvic bone and the hind quarters of the animal provide little room in which a knife can be manipulated. Consequently, dissecting the anal sphincter muscle and mobilizing the rectum while field dressing an animal is a difficult and tedious process which can lead to the puncturing of the intestinal wall and contamination of the meat. This is necessary in wild or domestic animals.

BRIEF SUMMARY OF THE INVENTION

The present invention includes an apparatus for coring out or dissecting an anal sphincter and mobilizing a rectum of an animal where the apparatus includes a probe attached to a first surface of a support member. At least one knife blade is attached to the support member a fixed distance from the probe. The distance from the surface of the probe to the knife blade is greater than a thickness of a rectal wall.

BRIEF DESCRIPTION OF THE DRAWINGS

FIG. 3 is a sectional view of the present invention along the section plane 2—2 as illustrated in FIG. 2.

FIG. 4 is a partial sectional view of a knife blade secured within a slot of a support member of the embodiment of the present invention as illustrated in FIG. 2.

DETAILED DESCRIPTION

Figure 1:
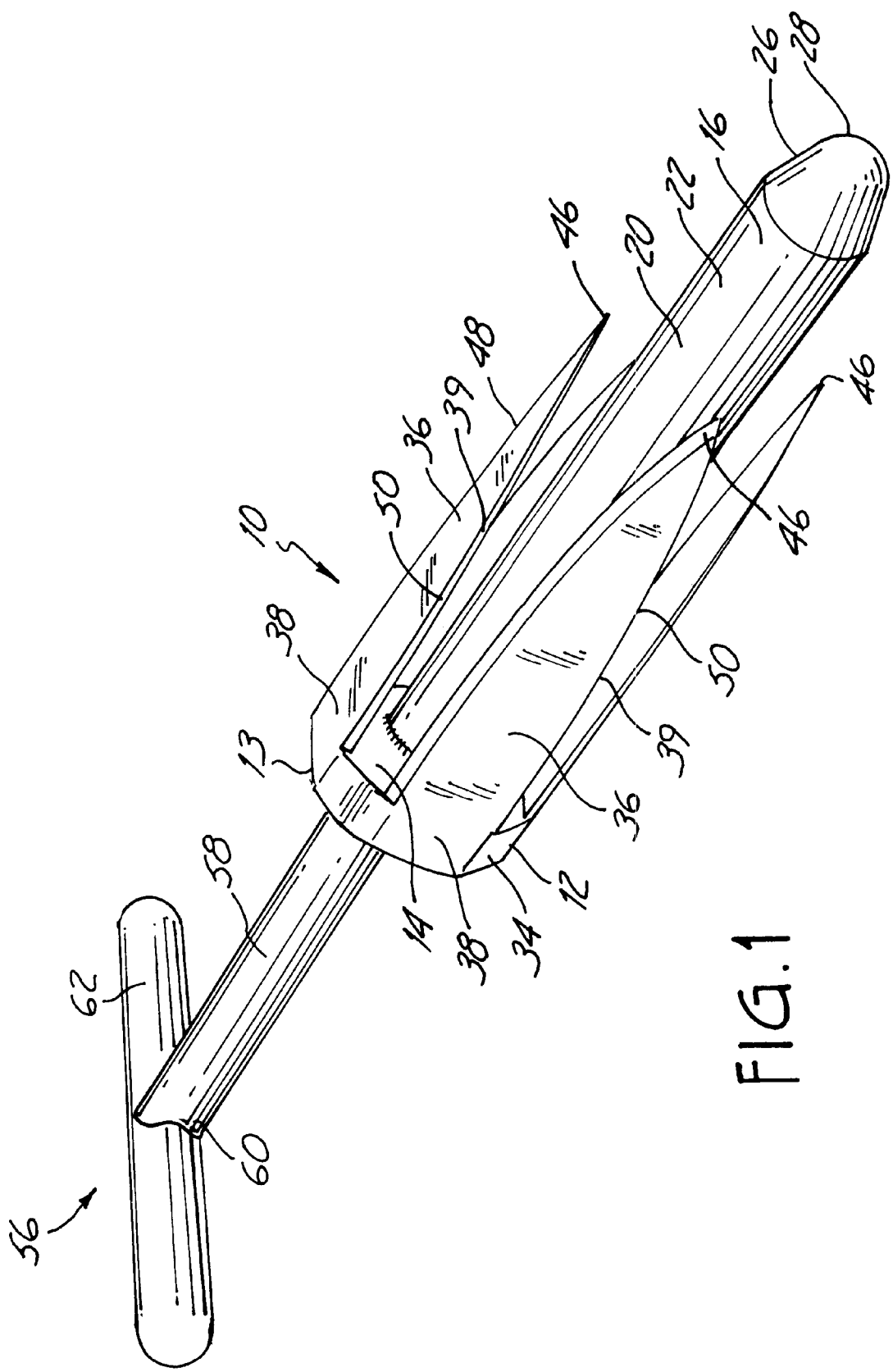
FIG. 1 is a perspective view of the present invention.

An apparatus for coring out or dissecting the anal sphincter and mobilizing the rectum of a dead animal (not shown) is generally illustrated at 10 in FIG. 1. Unless otherwise noted, similar components will be given the same reference number in this application. A great deal of care must be used in coring out or dissecting the anal sphincter and mobilizing the rectum while field dressing an animal because when an intestinal wall of the animal is inadvertently punctured, the contents of the intestine can contaminate the flesh of the animal, possibly making the flesh inedible. The effects of inadvertently puncturing the intestinal wall of the animal are magnified when the animal is being field dressed in a remote area where access to facilities including running water are limited or unavailable.

Figure 2:
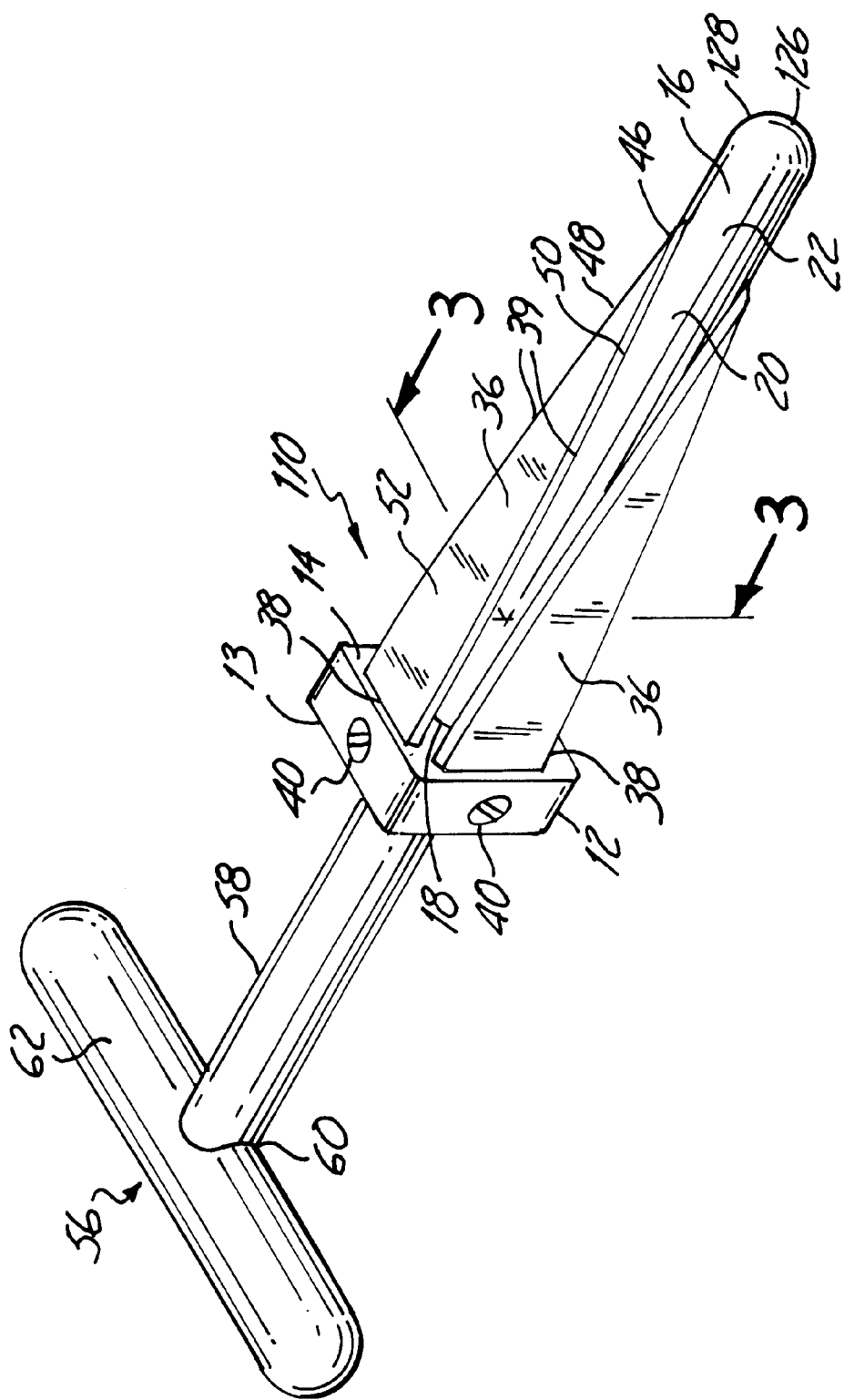
FIG. 2 is a perspective view of an alternative embodiment of the present invention.

Referring to FIGS. 1 and 2, the apparatus 10 or 110, respectively, includes a support member 12 having a first surface 14 to which a first end 18 of a probe 16 is attached, preferably by a weld. The probe 16 is preferably attached to the support member 12 substantially in the center of the first surface 14. The probe 16 is substantially circular in cross section wherein a main portion 20 of the probe 16 is preferably a pipe having an outer surface 22 and an inner surface 24 defining a bore as illustrated in FIG. 3. One skilled in the art will appreciate that the support member 12 and the probe 16 could also be constructed from a polymeric or plastic material.

Referring to FIG. 1, a cap 26 having a conical configuration with a rounded second end 28 is used to cap the main portion 20. The rounded second end 28 of the conical cap 26 enables the probe 16 to be easily inserted into the rectum of the animal. Additionally, the conical cap 26 is attached to the main portion 20 of the probe 16 such that there are no sharp edges, thereby preventing any inadvertent tearing of the intestinal or rectal wall.

Referring to FIG. 2, a rounded cap 126 is attached to a second end of the main portion 20 of the probe 16 proximate a second end 128, preferably by a weld, to ease the insertion of the probe 16 into the rectum of the dead animal. Additionally, the rounded cap 126 attaches to the main portion 20 of the probe 16 such that there are no sharp edges on the probe 16 thereby preventing any inadvertent tearing of the intestinal wall and contamination of the animal's flesh by the probe 16.

Although the rounded cap 26, 126 attached to the main portion 20 proximate to a second end 28 is the preferred embodiment of the probe 16, a solid piece of material having a rounded end could be used. Additionally, one skilled in the art will appreciate that constructing the probe 16 from a polymeric or plastic material allows the probe 16 to be molded from a single piece of material. Preferably, the probe 16 extends about 5 to 6 inches from the first surface 14 of the support member 12. The dimensions or measurements of the device could vary with larger or smaller animals.

Referring to FIG. 1, the knife blades 36 may be attached to the support member 12 by a weld. Preferably, the knife blades 36 are attached to an outer surface 34 of the support member 12, thereby creating a gap between a surface 22 of the probe 16 and the flat portion of the knife blades 36 which is greater than the thickness of the rectal wall of the animal.

Preferably, the distance between the surface 22 of the probe 16 and the flat portion of the knife blades 36 is ⅜ of an inch.

Alternatively, referring to FIG. 2, the knife blades 36 may be fixed into a selected position by cooperating with a plurality of slots 30. One of the plurality of slots 30 is illustrated in FIG. 4 and extend inwardly from the first surface 14 of the support member 12. Preferably, the plurality of slots 30 do not extend through the support member 12. The plurality of slots 30 are a same distance away from the outer surface 22 of the probe 16 and are equally spaced apart about a circumference of the probe 16. In a preferred embodiment, four equally spaced apart slots 30 are machined into the support member 12 from the first surface 14 about the outer surface 22 of the probe 16 as best illustrated in FIG. 3.

A bore 32 extends from a side surface 34 of the support member 12 and into each slot 30 wherein the bore 32 is preferably counter sunk. The support member 12 is preferably either circular or square in cross section. In the embodiment where the support member 12 has a square cross section, each bore 32 is preferably centrally located within each of the side surfaces 34 as best illustrated in FIGS. 2–4. In the embodiment where the support member 12 has a circular cross section (not shown), the plurality of bores 32 are substantially 90 degrees apart.

A knife blade 36 having a first end 38 configured to cooperate with the configuration of the slot 30 is positioned within each of the slots 30 as best illustrated in FIG. 4. Preferably, a rectangular surface defines the cross-section of each of the slots 30 and the first end 38 of the knife blade 36 has a rectangular cross section. With the first end 38 of the knife blade 36 having the same configuration as the slot 30, the knife blade 36, when positioned within the slot 30, is fixed into a selected position.

Each knife blade 36 is secured within each slot 30 by a screw 40. The screw 40 is inserted through the counter sunk bore 32 in the support member 12 and engages a surface 44 defining an aperture proximate the first end 38 of the knife blade 36 as best illustrated in FIG. 4.

The screw 40 preferably has a counter sunk head 42 which cooperates with the counter sunk bore 32. The screw 40 having the counter sunk head 42 engages the support member 12 such that the head 42 of the screw 40 does not extend beyond the side surface 34 of the support member 12 thereby preventing the users of the apparatus 10 from accidentally cutting themselves on the screw head 42.

Referring to FIGS. 1 and 2, proximate the first end 38, the knife blades 36 are at a maximum width. Preferably the knife blade 36 proximate the first surface 14 of the support member 12 is a width which is greater than a space between the knife blades 36 for reasons which will become apparent later.

The width of the knife blade 36 is continuously reduced at a constant rate from the maximum width proximate the first end 38 to a transition region 39 intermediate the first end 38 and a second end 46. The width of the knife blade 36 reduces at a greater rate from the transition region 39 to the second end 46 where the knife blade 36 reduces to a point.

Each side surface 48,50 of the knife blades 36 are machined into a sharp edge such that the knife blades 36 have two cutting surfaces. Preferably, the knife blades 36 extend about four inches from the first surface 14 of the support member 12. A flat surface 52 of each knife blade 36 is a distance from the outer surface 22 of the probe 16 closest to the knife blade 36 which is greater than a thickness of a rectal wall, preferably ⅜ of an inch.

The second end 28, 128 of the probe 16 preferably extends beyond the second ends 46 of the knife blades 36 as illustrated in FIGS. 1 and 2, respectively. With the probe 16 extending beyond the knife blades 36, the probe 16 is inserted into the rectum of the dead animal before the knife blades 36 sever or dissect the anal sphincter. A rigidity of the probe 16 aligns the rectum of the animal about the probe 16 such that the rectum will not be punctured by the knife blades 36.

A handle 56 is attached to a second surface 13 of the support member 12, preferably substantially in the center of the second surface 13. A first end (not shown) of a handle attaching shaft 58 is attached to the second surface 12 of the support member 12 preferably by a weld. A second end 60 of the handle attaching shaft 58 is attached to a handle bar 62 substantially in the center of the handle bar 62, preferably by a weld. The handle bar 62 is preferably circular in cross section providing the user a comfortable and safe gripping surface. One skilled in the art will appreciate that the handle 56 could also be constructed from a polymeric or plastic material.

Referring to FIG. 1, in operation, the second end 28 of the probe 16 is inserted into the rectum of a dead animal. As the probe 16 is further inserted into the rectum of the dead animal, the second ends 46 of the four knife blades 36 penetrate the flesh of the dead animal. The probe 16 and the knife blades 36 are inserted into the animal until the first surface 14 of the support member 12 is proximate the animal. As the knife blades 36 are inserted into the animal, separate portions of the anal sphincter are severed. As the knife blades 36 are further inserted into the animal, larger portions of the anal sphincter are severed because the double edged knife blades 36 widen from the point at the second end 46 to a maximum width proximate the first surface 14 of the support member 12.

After the first surface 14 of the support member 12 is positioned adjacent to the animal, the apparatus 10 is removed from the animal at least until the knife blades 36 exit the animal. The second end 28 of the probe 16 may be left inside or removed from the rectum of the animal. The apparatus 10 is rotated such that the points at the second ends 46 of the knife blades 36 are approximately half way between the severed portions of the anal sphincter caused by the first insertion of the knife blades 36. With the apparatus 10 repositioned, the probe 16 is inserted into the animal causing the pointed second ends 46 of the knife blades 36 to penetrate the flesh of the animal. Again, the probe 16 and the knife blades 36 are inserted into the animal until the first surface 14 of the support member 12 is proximate the animal.

Because the width of the knife blades 36 proximate the first end 38 are the same or greater than the distance between the knife blades 36, one skilled in the art will realize that two properly placed insertions of the apparatus 10 having four knife blades 36 will completely sever the anal sphincter. Additionally, one skilled in the art will realize that it is within the scope of this invention to have an apparatus 10 with only one knife blade 36 or more than one knife blade 36 and repeating the insertion and removal process as many times as necessary to completely sever the anal sphincter without puncturing the intestinal or rectal wall.

It is also within the scope of the present invention to insert the probe 16 into the rectum of the animal and the knife blades 36 into the animal until the first surface 14 of the support member 12 is proximate the animal thereby severing a portion of the anal sphincter. While the probe 16 and the knife blades 36 are inserted into the animal, a user, while gripping the handlebar 62, rotates the apparatus 10 about the probe 16 thereby completely severing the anal sphincter. Once the anal sphincter is completely severed or dissected, the probe 16 and the knife blades 36 are removed from the dead animal. On skilled in the art will recognize that the same methods for coring out or dissecting the anal sphincter and mobilizing the rectum of an animal will be utilized in the embodiment 110.

Referring to FIGS. 2–4, besides securing the knife blades 36 within the slots 30, the screws 40 also provide the user of the apparatus 110 a convenient way of removing the knife blades 36. After the apparatus 110 has been used to dissect the anal sphincter and mobilize the rectum, the apparatus 110 must be cleaned. The user of the apparatus 110 removes the screws 40 which allows the knife blades 16 to be removed from the slots 30. Each of the knife blades 36 are removed from the slots 30 and thoroughly cleaned. With the knife blades 36 removed from the slots 30, the support member 12, the probe 16, and the handle 56 can be safely and thoroughly cleaned.

Once the apparatus 110 is thoroughly cleaned, the knife blades 36 are reinserted into the slots 30 and secured into place by the screws 40. Alternatively, with the knife blades 36 preferably spaced ⅜ of an inch from the surface 22 of the probe 16, the apparatus 10, 110 can be safely cleaned with the knife blades 36 being in a fixed position. With the apparatus 10, 110 cleaned, the apparatus 10, 110 is then stored in a carrying case (not shown) which is also within the scope of the invention. The carrying case (not shown) is designed to protect the apparatus 10, 110 when not in use or being transported.

Figure 5:
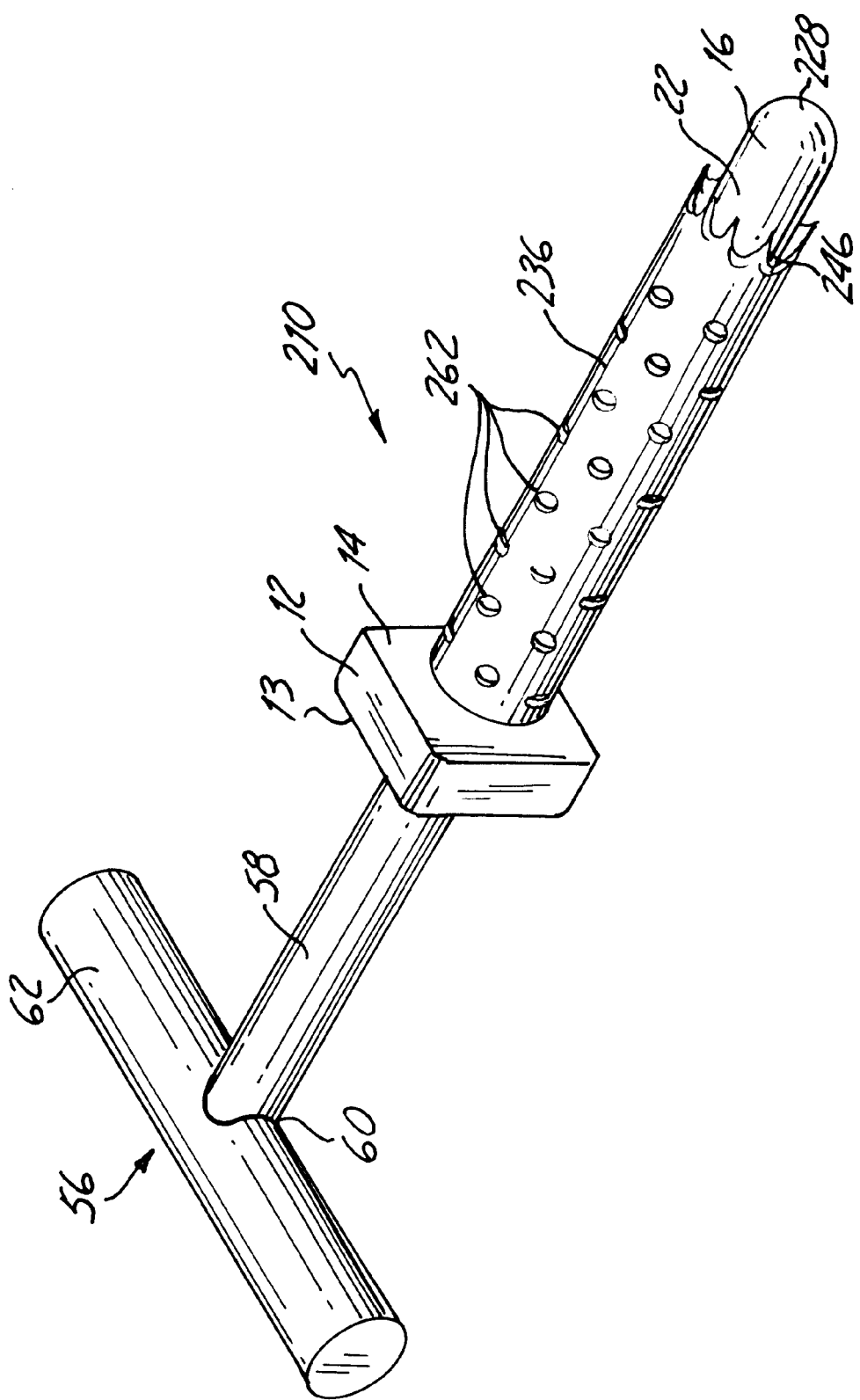
FIG. 5 is a perspective view of an alternative embodiment of the present invention.

An alternative embodiment 210 of the present invention is generally illustrated in FIG. 5. The apparatus 210 includes a similar probe 16 and handle 56 as in the embodiments 10, 110. A blade 236 having a circular cross section is inserted into a circular groove (not shown) within a first surface 14 of a support member 12. The groove (not shown) is an equal distance from an outer surface 22 of the probe 16. The blade 236 is secured within the groove (not shown) preferably by a plurality of screws (not shown) in a fashion similar that disclosed in the embodiment 10.

A second end 246 of the blade 236 is a cutting edge. The second end 246 of the blade 236 is either serrated or saw-toothed. Preferably, a second end 228 of the probe 16 extends beyond the second end 246 of the blade 236.

In operation the second end 228 of the probe 16 is inserted into the rectum of a dead animal. Upon further insertion of the probe 16, the second end 246 of the blade 236 engages the flesh of the animal. The operator of the apparatus 210 grips a handle bar 62 of the handle 52 which is attached to a second end 60 of a handle attaching shaft 58 having a first end (not shown) attached to a second surface 13 of the support member 12 and rotates the apparatus 210 while applying an inward force thereby cutting the anal sphincter of the animal. The apparatus 210 is rotated and further inserted into the animal until the first surface 14 of the support member 12 is proximate to the animal, thereby ensuring the anal sphincter has been completely severed and the rectum has been mobilized.

With the anal sphincter completely severed and the rectum mobilized, the apparatus 210 is removed from the animal. The blade 236 is removed from the support member 12 by removing the screws (not shown) allowing the blade 236 and the probe 16 to be cleaned.

A plurality of surfaces 262 defining through holes are within the blade 236. The plurality of surfaces 262 defining though holes aid in thoroughly cleaning the blade 236 by providing different angles from which water is rinsed onto the blade 236. Once the blade 236 has been thoroughly cleaned, the blade 236 is placed in the groove (not shown) and the screws (not shown) are reinstalled thereby securing the blade 236 within the support member 12. A case (not shown) is provided to store the embodiment 210 when not in use or in transit.

Although the present invention has been described with reference to preferred embodiments, workers skilled in the art will recognize that changes may be made in form and detail without departing from the spirit and scope of the invention.

What is claimed is:

1. A hand operated apparatus for coring out or dissecting an anal sphincter and mobilizing a rectum of an animal, the apparatus comprising:
    an probe attached to a first surface of a support member and extending therefrom; and
    at least one knife blade having a first end attached to the support member a fixed distance from the probe and extending from the first surface of the support member and reducing to a point at a second end and wherein the distance from a surface of the probe to a flat surface of the knife blade is greater than a thickness of the rectal wall.

2. The apparatus of claim 1 wherein a surface defining a slot extending inwardly from the first surface of the support member cooperates with a first end of the knife blade wherein the cooperation of the first end of the knife blade and the slot fix the knife blade into a selected position.

3. The apparatus of claim 2 wherein a bore extending inwardly from a side surface of the support member aligns with a surface defining an aperture proximate the first end of the knife blade when the knife blade cooperates with the slot such that a screw engaging the surface defining the aperture secures the knife blade within the slot.

4. The apparatus of claim 3 wherein the bore in the side surface of the support member is counter sunk such that a head of a counter sunk screw is even with or within the side surface of the support member when the screw engages the surface defining the aperture proximate the first end of the knife blade.

5. The apparatus of claim 1 wherein the knife blade is a double edged blade.

6. The apparatus of claim 1 wherein the knife blade is welded to the support member.

7. The apparatus of claim 1 wherein the probe is substantially circular in cross section and wherein a second end of the probe is rounded.

8. The apparatus of claim 1 wherein the second end of the probe extends beyond the second end of the knife blade.

9. The apparatus of claim 1 and further comprising a handle attached to a second surface of the support member.

10. A method of coring out an anal sphincter and mobilizing a rectum of an animal, the method comprising:
    providing a dead animal;
    providing an apparatus for coring out the anal sphincter and mobilizing the rectum of the animal, the apparatus comprising:
        a probe attached to a first surface of a support member and extending therefrom; and
        at least one knife blade attached to the support member a fixed distance from the probe and extending from the first surface of the support member wherein the distance from a surface of the probe to a flat surface of the knife blade is greater than a thickness of the rectal wall;

inserting a second end of the probe into the rectum of the animal such that the knife blade severs a portion of the anal sphincter, the probe and the knife blade being inserted into the animal such that the first surface of the support member is proximate the animal;

removing the knife blade from the body of the animal;

rotating a position of the knife blade proximate an unsevered portion of the anal sphincter;

inserting the second end of the knife blade into the animal such that the knife blade severs another portion of the anal sphincter, the probe and the knife blade being inserted into the animal such that the first surface of the support member is proximate the animal; and repeating the knife blade removal and insertion steps until the anal sphincter is completely cored out or dissected such that the rectum is mobilized.

11. The method of claim 10 wherein the probe remains in the rectum of the animal when the knife blade is removed, rotated and reinserted.

12. The method of claim 10 wherein the probe is removed from the rectum of the animal each time the knife blade is removed, rotated and reinserted.

13. The method of claim 10 wherein upon inserting the probe within the rectum of the animal and severing a portion of the anal sphincter with the knife blade, the apparatus is rotated within the animal that the anal sphincter is cored out or dissected and the rectum is mobilized.

14. The method of claim 10 wherein a surface defining a slot within the support member cooperates with a first end of the knife blade to prevent movement of the knife blade with respect to the probe wherein a bore within a side surface of the support member aligns with a surface defining an aperture proximate the first end of the knife blade when the knife blade positions within the slot such that a screw engaging the surface defining the aperture secures the knife blade within the slot.

15. The method of claim 10 wherein the knife blade is a double edged blade reducing to a point at the second end.

16. The method of claim 10 wherein the knife blade comprises a substantially circular cross sectional serrated or saw-toothed edge proximate a second end.

17. The method of claim 10 wherein the probe is substantially circular in cross section wherein a second end of the probe is rounded.

18. The method of claim 10 wherein the second end of the probe extends beyond the second end of the knife blade.

19. The method of claim 10 wherein the apparatus further comprises a handle attached to a second surface of the support member.

* * * * *